United States Patent [19]

Marom

[11] Patent Number: 4,626,919
[45] Date of Patent: Dec. 2, 1986

[54] APPARATUS FOR DE-EMPHASIZING LOW SPATIAL FREQUENCIES IN OPTICAL IMAGING SYSTEMS

[75] Inventor: Emanuel Marom, Beverly Hills, Calif.

[73] Assignee: Hughes Aircraft Company, Los Angeles, Calif.

[21] Appl. No.: 747,602

[22] Filed: Jun. 24, 1985

[51] Int. Cl.$^4$ .............................................. H04N 9/06
[52] U.S. Cl. .................................................... 358/225
[58] Field of Search ........................... 358/225, 226, 55

[56] References Cited

U.S. PATENT DOCUMENTS

| 4,100,570 | 7/1978 | Nobutoki et al. | 358/55 X |
| 4,178,611 | 12/1979 | Okano | 358/55 X |
| 4,539,584 | 9/1985 | Otake | 358/55 X |
| 4,554,585 | 11/1985 | Carlson | 358/225 X |
| 4,575,193 | 3/1986 | Greivenkamp | 358/55 X |

OTHER PUBLICATIONS

Low Frequency De-Emphasis of the Modulation Transfer Function, I, One Dimensioned Case, Optical Communications, vol. 41, p. 388 (1982) N. Konforti and E. Marom.
Optical Processing of One-Dimensional Signals, Optics Communications, vol. 42, p. 87, (1982), H. Bartelt and L. W. Lohmann.
Two-Step Incoherent Optical Method for the Realization of a Rho Filter, Optics Letters, vol. 8, p. 587 (1983), C. Han & K. Murata.
Low Frequency De-Emphasis of the Modulation Transfer Function, II, Two-Dimensional Case, Proceedings of the Tenth International Optical Computer Conference, p. 214, Apr., 1983, Boston, Mass., N. Konforti and E. Marom.
Bipolar Pointspread Function Synthesis by Phase Switching, Applied Optics, Feb. 1977, vol. 16, No. 2, W. T. Rhodes.
Rapid Communications, Applied Optics, Feb. 1977, vol. 16, No. 2, by A. W. Lohmann, Incoherent Optical Processing of Complex Data.

*Primary Examiner*—Donald A. Griffin
*Attorney, Agent, or Firm*—A. W. Karambelas

[57] ABSTRACT

Apparatus is disclosed for de-emphasizing low spatial frequencies in a two-dimensional optical imaging system. The apparatus (10) includes a source of incoherent light (12) adapted to be directed toward a source of optical information (14); first (17) and second (19) coplanar strips of pupils (16, 18) for transmitting light from the source of optical information (14), the strips (17, 19) being parallel to one another, the pupils (16) of the first strip being randomly distributed therein and circular in shape, the pupils (18) of the second strip being randomly distributed therein and ring shaped; a lens system (20) positioned to focus light passing through the strips (17, 19) of pupils (16, 18) onto an output plane (22); and a Ronchi grating (24) positioned between the lens (20) system and the output plane (22) and parallel thereto at a distance from the output plane (22) such as to provide interlacing of the images through the two strips of pupils, the grid lines (25) of the grating being parallel to the strips (17, 18) of pupils.

12 Claims, 6 Drawing Figures

APPARATUS FOR DE-EMPHASIZING LOW SPATIAL FREQUENCIES IN OPTICAL IMAGING SYSTEMS

BACKGROUND OF THE INVENTION

This invention relates to optical systems and, more particularly, to improved apparatus for de-emphasizing low spatial frequencies in optical imaging systems.

It is a characteristic of all optical pupils that low spatial frequencies are emphasized. This emphasis of low frequencies causes a derogation and often a complete masking of important optical information.

Various attempts have been made to eliminate this low spatial frequency bias. For example, in our paper *Low Frequency De-Emphasis of the Modulation Transfer Function, I. One Dimensional Case*, Optical Communications, Vol. 41, p. 388 (1982), N. Konforti and I disclosed an optical system in which an input image of an object is directed through a pair of pupils and an imaging lens. The lens is adjusted so that the object's image is projected onto an output image plane in the form of a photosensitive plate positioned behind a Ronchi ruling or grating. In this particular arrangement, the pupils are rectangular in shape and their centers are equidistant from the symmetry axis of the optical system. Each pupil provides an optical transfer function which is different from that of the other pupil. The two pupils are selected to have equal transmissivity, so that equal optical energy is transmitted through each pupil. One pupil is in the form of a single rectangle while the other pupil is formed of two rectangles.

The grating lines of the Ronchi grating are perpendicular to a line extending between the two pupils. The grating period and the distance between the grating and the photosensitive plate are chosen in accordance with geometric relationships specified in the paper. The images projected through the two pupils are sampled and interlaced by the Ronchi grating to form a single composite image on the photosensitive plate. This composite image is recorded on the photographic plate and, after developing, is analyzed with coherent illumination. The coherent light is diffracted by the recorded grating pattern and a first order beam is selected by an aperture properly located. The image formed by the beam associated with the first diffraction order is the desired output.

It is also postulated in the paper that one could generate a real-time version of the composite image by utilizing the photosensitive surface of a television camera in place of the photographic plate. The system disclosed in this paper is limited to the suppression of low spatial frequencies of the optical transfer function in only one dimension as a result of the rectangular pupils utilized. Another limitation of this sytem is the low level of illumination available at the output image plane due to the limited amount of light transmitted through the small pupils.

H. Bartelt and A. W. Lohmann, in their paper *Optical Processing of One-Dimensional Signals*, Optics Communications, Vol. 42, p. 87 (1982), discuss a general optical system for processing data which are not two-dimensional. The system utilizes two pupils in the form of single and double slits, respectively. A desired optical transfer function is synthesized by sequentially recording the results of two different filtering operations using a television camera and storing the data in an image memory. The two results are subtracted digitally and displayed on a monitor. Accordingly, while electronic sensing apparatus may be used as the photosensitive surface in systems of this type, a two step process is required to produce the result. As a consequence of the two-step process the output image is not available optically, thus preventing further optical processing or manipulation of the image. The amount of light reaching the output image plane is also severely limited.

C. Han and K. Murata, in their paper *Two-Step Incoherent Optical Method for the Realization of a Rho Filter*, Optics Letters, Vol. 8, p. 587 (1983), discuss an optical subtraction process in which individual circular statistical filters having a conventional low pass response with different cut-off frequencies are used to obtain a two dimensional rho filter by substraction of the optical transfer functions. Such a filter provides a linearly increasing transfer function for low spatial frequencies. Each of the two circular statistical amplitude filters has different sized opaque disks randomly distributed over its total aperture. The filters are placed, one after the other, in the system between an incoherently illuminated input image and a lens which forms an image on a vidicon receiving plane. Each image is separately digitized and stored in a digital image memory. By subtraction of the digitally stored images, a resultant image is obtained and displayed on the television monitor. This resultant image has the appropriate spatial frequencies de-emphasized. However, the process requires two steps to complete and, therefore, does not enable a real time solution. Moreover, the output image is not available optically, thus preventing further optical processing or manipulation of the image.

In our paper *Low Frequency De-Emphasis of the Modulation Transfer Function, II. Two-Dimensional Case*, Proceedings of the Tenth International Optical Computer Conference, p. 214, April, 1983, Boston, Mass., N. Konforti and I disclose a non-interacting circularly symmetric system utilizing two pupils, one circular and the other ring shaped, for de-emphasizing low spatial frequency components in two dimensions. The arrangement of the various system components is similar to that described above in the earlier Marom and Konforti paper. A Ronchi grating is employed to produce superposed interlacing images on a photosensitive material. Criteria are given for the design and placement of the Ronchi grating to obtain the appropriate composite image which may then be filtered to obtain the substractive result of the optical transfer functions of the two pupils. The criteria for selecting the dimensions of the pupils to obtain a band-pass filter characteristic are also provided. This filter system may be used to de-emphasize the low spatial frequencies and to allow a more correct presentation of optical information. This system also severely limits the amount of light reaching the output image plane.

It is one purpose of the present invention to provide an improved system for de-emphasizing low spatial frequencies in the optical analysis of incoherently illuminated two dimensional objects.

It is another purpose of the present invention to provide an improved system of low spatial frequency de-emphasis for incoherently illuminated two-dimensional objects which may be operated in real time and which transmits substantial amounts of light to the output image plane.

It is yet another purpose of the present invention to provide an optical image of an object with low spatial frequencies de-emphasized, whereby this image may be optically processed, analyzed and manipulated without the need of an electronic to optic converter.

SUMMARY OF THE INVENTION

The foregoing purposes and other objects of the present invention are realized in an optical imaging system where de-emphasizing of low spatial frequencies in two dimensions takes place. In this system the small pupils of prior art methods are replaced by two long rectangular areas or strips which are spaced equidistant from the axis of the imaging system and which have their longer dimensions parallel to one another. Each of the strips includes a plurality of pupils randomly spaced over the total area of the strip. This system has the advantage of providing a substantial increase in the light available at the output image plane, of producing selectable optical filter transfer functions, and of accomplishing spatial frequency de-emphasis in a single rather than a two step process thereby allowing real time processing. The system of the present invention also provides an optical output image which may be optically processed, analyzed and manipulated without the need of an electronic to optical converter.

Other features and advantages of the invention will become apparent from a reading of the specification taken in conjunction with the drawings in which like reference designators refer to like elements throughout the several views.

DETAILED DESCRIPTION OF THE INVENTION

Figure 1:
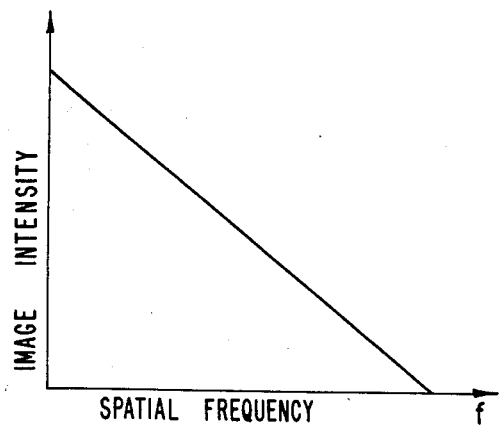
FIG. 1 is a graphical representation of the naturally occurring spatial frequency response of an incoherently illuminated optical system in the presence of a simple pupil.

It is a natural phenomenon that pupils in optical imaging systems produce images with emphasized low spatial frequencies. Such emphasis may act to mask or otherwise obscure useful information contained in an image. FIG. 1 is an example of the naturally occurring spatial frequency response of a pupil. It will be recognized by those skilled in the art that such heightened low frequency response will often mask a substantial portion of useful information.

The prior art arrangements discussed above disclose various methods for de-emphasizing low spatial frequencies so that more useful information is obtained. These arrangements all use some method of subtracting the optical transfer functions of two pupils transmitting two images of the same scene. FIGS. 2(a) and 2(b) are illustrations of the optical transfer functions of two pupils such as those used in the prior art. FIG. 2(c) illustrates the resulting function after subtraction of the two functions of FIGS. 2(a) and (b).

Figure 2:
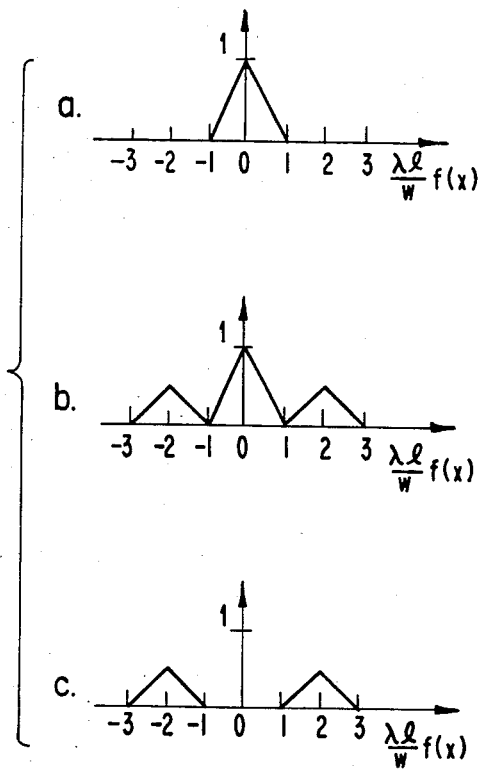
FIG. 2 includes two graphs representing the optical transfer functions of an optical system with two different pupils and a third graph representing the resulting composite transfer function synthetically generated by subtraction of the functions in the first two graphs.

The physical arrangements for accomplishing the results illustrated in FIG. 2 involve various lens systems with pupils interposed between the input image and the lens. The dimensions of the pupils and optical systems are carefully chosen so that the images obtained through them are of the same size, intensity, magnification, and have the same aberrations. This is usually accomplished by employing a single optical train. Images transmitted through the pupils are projected by the lens system onto means for electronically or optically filtering the information to accomplish the subtraction of the optical transfer functions.

Some of the prior art methods discussed above severely limit the amount of light reaching the output image, or processing plane. Others of these methods require sequential processing operations and, thus, are not real time operations. Still others are limited to one dimensional processing. Still others do not present the output image optically. The present invention overcomes these limitations, as described below.

Figure 3:
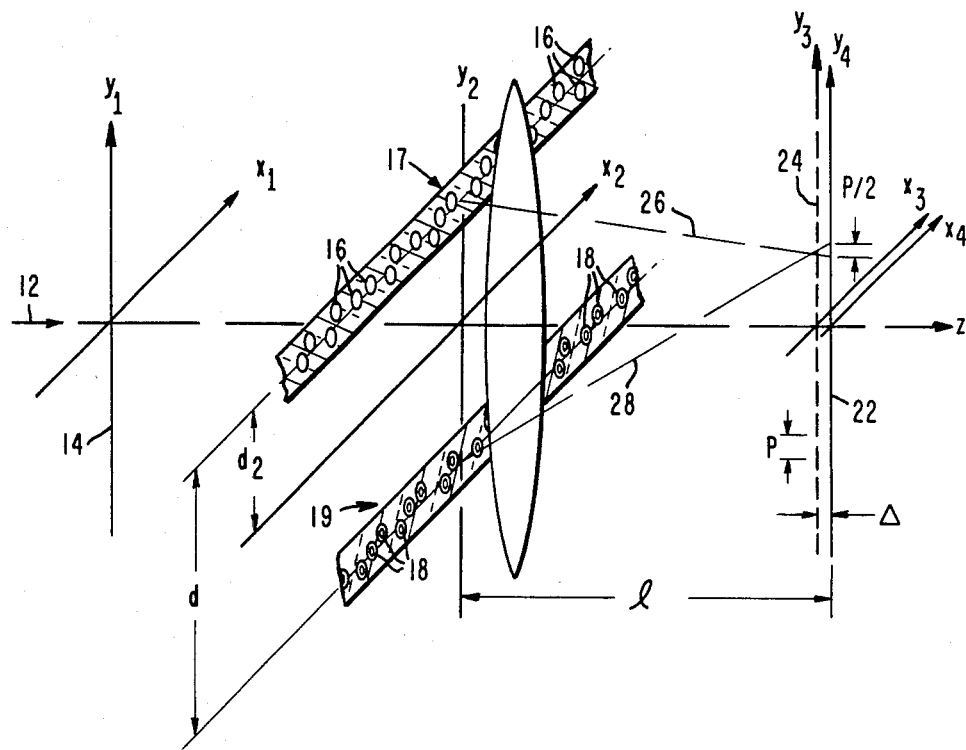
FIG. 3 is an arrangement in accordance with the teachings of the present invention for combining the optical transfer functions obtained via two pupils subtracted in the manner shown in FIG. 2 to obtain a composite image.
Figure 4:
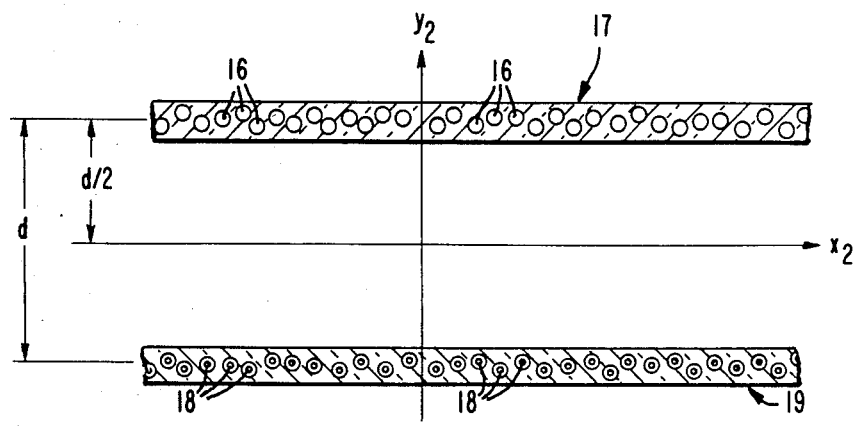
FIG. 4 is a side view illustrating the distribution of pupils in the aperture of an imaging lens used in the arrangement of FIG. 3.
Figure 5:
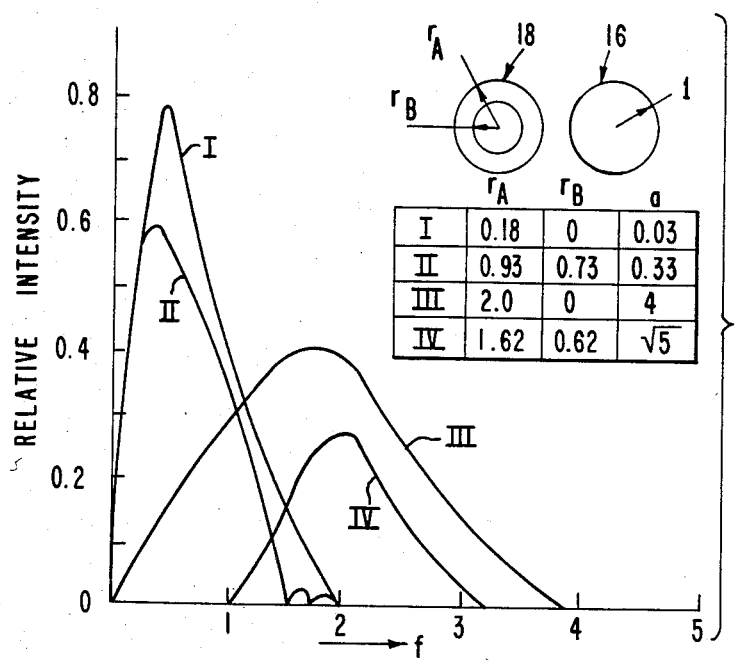
FIG. 5 shows the resultant synthetically generated optical transfer functions obtained, using the arrangement of FIG. 3, by subtraction of pupil transfer functions for pupils of various dimensions.

FIG. 3 illustrates an arrangement 10 in accordance with the present invention which may be used for the processing of two dimensional information with substantially higher light intensities than those provided by prior art systems. The arrangement 10 includes a source of incoherent light 12 arranged to the left in FIG. 3 of a transparency 14 or other source of input image information lying in a plane defined by axes $x_1$ and $y_1$. The source of light 12 may be any of a number of types well known in the prior art. The source 12 projects light through the transparency 14 and through a plurality of circular pupils 16 randomly distributed in a first strip 17 and through a plurality of ring shaped pupils 18 randomly distributed in a second strip 19. The strips 17 and 19 lie in a pupil plane defined by axes $x_2$ and $y_2$ and are spaced apart with their center lines at a distance $d/2$ from the symmetry axis $z$ of the system FIG. 4 more clearly shows the distributed pupils 16 and 18 as they appear in the aperture of an imaging lens 20, and an enlarged view of one of the pupils 16 and 18 is shown in the insert of FIG. 5. The imaging lens 20 is positioned behind the pupil plane and acts to project the images of the input object onto a light sensitive output image or processing screen 22 which lies in the plane defined by axes $x_4$ and $y_4$.

Interposed between the lens 20 and the screen 22 is a Ronchi grating 24 which has its grid lines 25 parallel to the axis $x_2$ and hence parallel to the strips 17 and 19. The grid 24 is spaced from the screen 22 a distance $\Delta$ such that the images from the pupils 16, 18 are interlaced and produce a composite image which may be filtered (by coherent light or electronically), to give the desired substractive characteristic. The image intensity transmitted through the pupils 16 should be equal to the image intensity transmitted through the pupils 18. Such equalization may be accomplished by using any of a number of uniform intensity attenuators (e.g., a neutral density filter) in conjunction with the appropriate strip 17, or 19.

The Ronchi grating provides sampling of the images transmitted through the pupils 16, and 18 as well as the means for interlacing these images as indicated by ray lines 26 and 28 in FIG. 3. Since it is desirable that the images retain their full spectral context, a restriction is placed on the sampling frequency, i.e., the Ronchi grating frequency. Thus, if the highest resolvable detail in the image is $\mu$, the grating period shown as p in FIG. 3 should be at least two times smaller. Accordingly, assume that $$p = \mu/2.5 \qquad (1)$$

For a pupil of width W in an incoherent optical system, the maximal or cutoff frequency $f_{c.o.}$ passed by the system is $$f_{c.o.} = W/(\lambda l) \qquad (2)$$

where $\lambda$ is the central wavelength of the illuminating source and l is the separation between the pupil and the images planes, as shown in FIG. 3. Note that in the instance of circular and ring-shaped pupils, the dimension W above should be set equal to the diameter of the larger of the two types of pupils. Combining equations 1 and 2, it may be shown that the Ronchi grating period should be $$p = \lambda l/(2.5 W) \qquad (3)$$

For pupils separated by a distance d, it may be shown by virtue of geometrical considerations that $$p/(2\Delta) = d/l \qquad (4)$$

Eliminating the dependence on l yields $$\Delta = 1.25 p^2 W/(\lambda d) \qquad (5)$$

Since the grating 24 (providing the sampling function) is proximity imaged onto the output plane 22, the separation $\Delta$ should be smaller than the corresponding Rayleight distance, i.e.

$$\Delta \leq (p/2)^2/\lambda \qquad (6)$$

Substitution into equation 5 yields $$d/W \geq 5 \qquad (7)$$

Therefore, as design guidelines one should choose a Ronchi grating 24 with a period p which is on the order of 2 to 2.5 times smaller than the desired minimum image resolution $\mu$, should place it a distance $\Delta$ equal to $\mu^2/(25\lambda)$ in front of the image plane 22, should limit the diameter of the largest of the two pupils 16, 18 to $W = \lambda l/\mu$ and should place them apart from each other at a distance d on the order of five times the largest pupil diameter. It is interesting to note that neither the distance between the plane of the pupils 16, 18 and the lens 20 nor the exact positioning of the pupils 16, 18 along the axis $x_2$ are critical to the operation of the system 10.

One of each of the pupils 16 and 18 is shown in detail in FIG. 5. For purposes of the following analyses, the inner radius of the ring pupil 18 is defined as $r_B$, the outer radius of the pupil 18 is defined as $r_A$, and the radius of the circular pupil 16 is normalized as 1. Considering the system of FIG. 3 it may shown that the composite optical transfer function of the ring pupil 18 (with radii $r_A$ and $r_B$) and the circular pupil 16 (with unit radius) is given by:

$$C(x) = C_1(x; r_A, r_B) - \alpha C_2(x; 1, 0) \qquad (8)$$

where $C_1$ is the autocorrelation of the pupil 18, x is the spatial frequency parameter, $C_2$ is the autocorrelation of circular pupil 16 whose "ring" radii are 1 and 0, and $\alpha$ is the attenuation factor of the circular pupil (defined as the ratio of the area of the ring pupil 18 to that of the circular pupil 16). Due to the fact that there is no light amplification in the system of FIG. 3 when $\alpha$ is greater than 1, a factor of $1/\alpha$ should be applied in its place to the ring pupil 18 instead of the circular pupil 16.

It may be shown that by proper choice of the values of $r_A$, $r_B$ and $\alpha$, a wide variety of optical transfer functions may be obtained.

For example, a band-pass transfer function may be obtained if the function C(x) and its first three derivatives vanish at the origin. These requirements lead to $$r_A = (1 + \sqrt{5})/2 = 1.618034 = \phi \qquad (9)$$

$$r_B = 1/\phi = (\sqrt{5} - 1)2 = \phi - 1 = 0.618034$$

and $$a = r_A^2 - r_B^2 = \phi^2 - (\phi - 1)^2 = \sqrt{5} \qquad (10)$$

where $\phi$ is the mathematical constant known as the "Golden Ratio".

On the other hand, if a rho-filter is desired where the optical transfer function is linear near the origin, the requirements are that $C(0) = C''(0) = C'''(0) = 0$. From these equations, various systems may be designed having transfer functions with different linear slopes. FIG. 5 shows curves representing four different optical transfer functions which may be obtained using the system of FIG. 3, and the values of $r_A$, $r_B$ and corresponding thereto. Curves I, II and III correspond to rho-filters, while curve IV corresponds to the bandpass filter derived above.

The system of the present invention described above enables real time processing of information in two dimensions while substantially improving the level of illumination available at the output image plane. Real time processing may be accomplished using a video camera positioned at the output image plane in a manner disclosed in my earlier paper discussed above.

An advantage of the invention is that an optical image having low spatial frequencies de-emphasized can be provided and processed without the aid of an electronic to optical converter. On the other hand, for some applications an electronic to optical converter can be employed.

Figure 6:
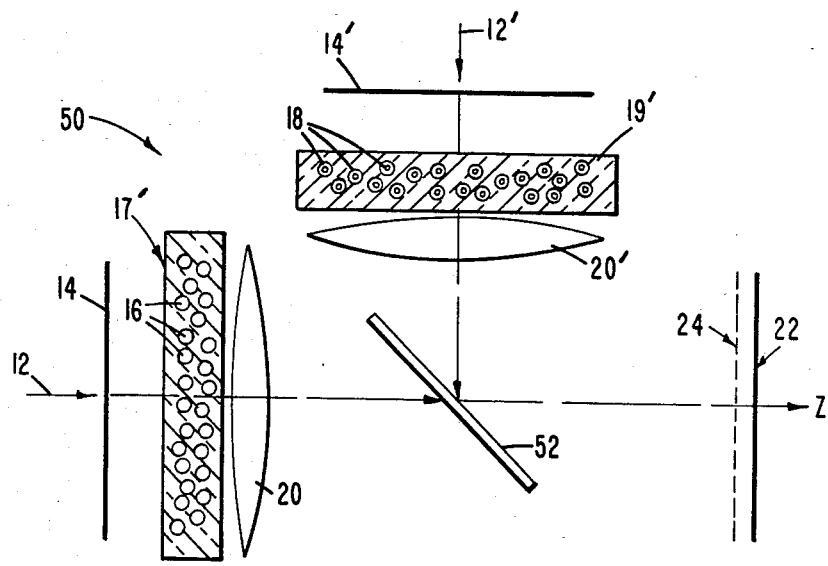
FIG. 6 is an alternate embodiment of the invention in which an image and its replica are employed in an arrangement for combining optical transfer functions in the manner shown in FIG. 2, using two independent imaging systems.

An alternate embodiment 50 of the invention is shown in FIG. 6. In this embodiment, as in the previously described embodiment 10, the source 12 of incoherent light projects light through the transparency or input image 14. Positioned normal to the z axis is a second incoherent light source 12'. The source 12' projects light though a transparency or input image 14' which is an identical replica of the image 14.

Light from the image 14 passes through a plurality of the circular pupils 16 randomly arranged on a substrate 17' which is typically of sufficient size to cover the aperture of the imaging lens 20 positioned behind the plane of the pupils 16. In like manner, light from the image 14' passes through a plurality of the ring-shaped pupils 18 randomly arranged on a substrate 19' which is typically of sufficient size to cover the aperture of imaging lens 20' positioned behind the plane of the pupils 18.

A beam-splitter, which may be in the form of a partially silvered mirror is positioned as shown in FIG. 6 so that light from the lens 20 is transmitted through the splitter 52 and through the Ronchi grating 24 to impinge on the output image plane 22 in a manner analogous to the operation of the system 10. Light from the lens 20' is reflected by the splitter 52 so that it too is directed through the Ronchi grating 24 to impinge on the output image plane 22.

By comparing the system 10 with the system 50 it will be appreciated that the system 50 employs two separate light sources, input images, pupil planes, and lens to provide the two images which are combined by the splitter 52 and interlaced by the grating 24 to produce the desired composite image. One advantage of the system 50 is that the substrates 17' and 19' may each be made to cover the aperture of the corresponding lens, thus providing a substantial level of illumination at the output image plane 22. In implementing the system 50 one should be careful in meeting the requirement that the characteristics of the images (e.g., intensity, contrast, size) from the lens 20 and the lens 20' must be substantially identical.

While particular embodiments of the invention have been described in detail, various other adaptations and modifications will become apparent to those skilled in the art. It is, therefore, to be understood that the invention is limited only by the claims appended hereto.

What is claimed is:

1. Apparatus for de-emphasizing low spatial frequencies in a two-dimensional optical imaging system, comprising:
   first and second pluralities of pupils each randomly distributed in first and second parallel, coplanar strips, respectively, where the plane of the strips is positioned parallel to and between a source of optical information and an output image plane, the pupils of the first strip being circular in shape, and the pupils of the second strip being ring-shaped;
   imaging means positioned between the plane of the pupils and the output image plane for imaging the light passing through the pupils from the source of optical information onto the output image plane; and
   a Ronchi grating positioned between the imaging means and the output plane and parallel thereto at a distance from the output plane such as to provide interlacing of the image transmitted through the first and second pluarlities of pupils, the grid lines of the grating being parallel to the strips of pupils.

2. The apparatus of claim 1 in which the distance from the center of the first strip to the center of the second strip is equal to or greater than four times the largest pupil diameter.

3. The apparatus of claim 1 in which the distance from the center of the first strip to the center of the second strip is equal to or greater than five times the largest pupil diameter.

4. The apparatus of claim 1 in which the diameter of the larger of the pupils in the two pluralities of pupils is less than or equal to $\lambda l/\mu$, where $\lambda$ is the wavelength of the light from the source of optical information, l is the distance between the plane of the strips and the output plane, and $\mu$ is the highest desired resolvable detail in the source of optical information.

5. The apparatus of claim 1 further comprising means for optical to electronic conversion with the input of said conversion means positioned so as to detect the image present in said output image plane and convert said detected image into a desired electronic signal.

6. The apparatus of claim 1 in which the output image plane includes a photosensitive surface.

7. The apparatus of claim 6 in which the photosensitive surface is the screen of a video camera.

8. Apparatus for de-emphasizing low spatial frequencies in a two-dimensional optical imaging system, comprising:
   a first plurality of pupils randomly distributed in a first substrate, where the plane of the first substrate is positioned parallel to and between a source of optical information and an output image plane;
   first imaging means positioned between the plane of the first substrate and the output image plane for imaging the light passing through the first plurality of pupils from the source of optical information onto the output image plane;
   a second plurality of pupils randomly distributed in a second substrate where the plane of the second substrate is normal to the output image plane and is positioned parallel to a replica of the source of optical information between that replica and the output image plane;
   second imaging means positioned between the plane of the second substrate and the output image plane;
   beam splitter means positioned between the first and second imaging means and the output image plane so that light from the first imaging means passes through the splitter means and is transmitted to the output plane, and light from the second imaging means is reflected by the beam splitter means so that it too is transmitted to and imaged on the output image plane; and
   a Ronchi grating positioned between the beam splitter means and the output image plane such as to provide interlacing of the images transmitted through the first and second pluralities of pupils.

9. The apparatus of claim 8 in which the pupils in the first plurality of pupils are circular, and the pupils in the second plurality of pupils are ring-shaped.

10. The apparatus of claim 8 further comprising means for optical to electronic conversion with the input of said conversion means positioned so as to detect the image present in said output image plane and convert said detected image into a desired electronic signal.

11. The apparatus of claim 8 in which the output image plane includes a photosensitive surface.

12. The apparatus of claim 8 in which the photosensitive surface is the screen of a video camera.

* * * * *